US008200208B1

(12) United States Patent
Yang et al.

(10) Patent No.: US 8,200,208 B1
(45) Date of Patent: Jun. 12, 2012

(54) METHOD AND SYSTEM FOR AUTOMATIC MEASUREMENT OF CAPACITY OF CELLULAR NETWORK

(75) Inventors: Jin Yang, Orinda, CA (US); Yee Sin Chan, San Jose, CA (US)

(73) Assignee: Cellco Partnership, Basking Ridge, NJ (US)

( * ) Notice: Subject to any disclaimer, the term of this patent is extended or adjusted under 35 U.S.C. 154(b) by 882 days.

(21) Appl. No.: 12/248,399

(22) Filed: Oct. 9, 2008

(51) Int. Cl.
    *H04W 4/00* (2009.01)
    *H04W 40/00* (2009.01)
(52) U.S. Cl. .................. 455/422.1; 455/522; 455/447
(58) Field of Classification Search .............. 455/67.11, 455/501, 518, 522, 447, 453, 452.2, 423; 370/328, 468, 229, 329, 312, 260; 709/219
    See application file for complete search history.

(56) References Cited

U.S. PATENT DOCUMENTS

| | | | |
|---|---|---|---|
| 6,243,584 B1 | 6/2001 | O'Byrne | |
| 6,996,374 B1 * | 2/2006 | Bao et al. | 455/67.11 |
| 7,002,920 B1 | 2/2006 | Ayyagari et al. | |
| 7,941,503 B2 * | 5/2011 | Benco et al. | 709/219 |
| 2004/0110534 A1 | 6/2004 | Chung et al. | |
| 2004/0229617 A1 | 11/2004 | Sato | |
| 2006/0045045 A1 * | 3/2006 | Blessent et al. | 370/328 |
| 2006/0068717 A1 | 3/2006 | Gandhi et al. | |
| 2006/0229089 A1 * | 10/2006 | Tokgoz et al. | 455/501 |
| 2008/0039129 A1 | 2/2008 | Li et al. | |

OTHER PUBLICATIONS

Shoup et al CDMA-based DCP Communication Systems pp. 1-18 May 12, 2004.
"Interface Solutions: Improve Performance Realize New Traffic" ISCO International CDG Technology Forum pp. 1-23 Oct. 1, 2002.
Chen et al "Interface-based Guard Margin Call Admissions Control for CDMA Multimedia Wireless Systems" University of Southern California.
"Cellular Telephone Basics III: Cell Sector Terminology" Privateline Telecommunication Expertise pp. 1-5 Jan. 1, 2006.
"Rise Over Thermal" Wikipedia : Free Encyclopedia Feb. 28, 2008 http://en.wikipedia.org/wiki/Rise_over_thermal.
"Cellular Network" Wikipedia: Free Encyclopedia, pp. 1-6 Feb. 27, 2008 http://en.wikipedia.org/wiki/Cellular_network.

* cited by examiner

*Primary Examiner* — Kiet Doan

(57) ABSTRACT

A method for measuring a call capacity of a cellular network which includes a plurality of sectors including a test sector and neighboring sectors defined by a number of base stations. A plurality of voice communication generators and a plurality of best effort generators are located both in the test sector and the neighboring sectors. Interference level from activated test units located within the neighboring sectors and the test sector represents total radio resources of the test sector. Throughput of best effort generators is measured while activating a predetermined number of voice communication generators within the test sector. An approximate relationship between the throughput of best effort generators and the number of activated voice communication generators is obtained. The call capacity within the test sector is determined from the approximate relationship between the throughput of best effort generators and the number of the activated voice communication generators. The call capacity within the test sector is adjusted to a real commercial communication environment based on real interference levels from the neighboring sectors.

31 Claims, 4 Drawing Sheets

METHOD AND SYSTEM FOR AUTOMATIC MEASUREMENT OF CAPACITY OF CELLULAR NETWORK

FIELD OF THE INVENTION

The present subject matter relates to a method and a system for automatic measurement of call capacity of a cellular type mobile or wireless communication network.

BACKGROUND

A typical wireless communication network (e.g., Frequency Division Multiple Access (FDMA), Time Division Multiple Access (TDMA) and Code Division Multiple Access (CDMA)) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile station. A mobile station within the coverage area of that base station can be interested in receiving one, more than one or all the data streams carried by the composite stream. Likewise, a mobile station can transmit data to the base station or another mobile station. Such communication between base station and mobile station or between mobile stations can be degraded due to channel variations and/or interference power variations. Service quality may also be impacted by congestion in at least some types of wireless networks.

Cellular wireless communication systems are designed to serve many MS's distributed in a large geographic area by dividing the area into cells. At the center of each cell, a base station is located to serve mobile stations operating in the area of the cell. Each cell can be further divided into sectors by using multiple sectorized antennas. Typically three sectors per cell are used. The term sector is used, however, even when there is only one sector per cell. In each cell, a base station serves one or more sectors and communicates with multiple mobile stations in its cell. The communication between the base station and the mobile station uses analog modulation (such as analog voice) or digital modulation (such as digital voice or digital packet data) to transmit and receive such data (analog or digital).

Among cellular networks, FDMA and TDMA networks have fixed numbers of traffic channels determined by time slots in the TDMA and the number of frequency channels in the FDMA. In the FDMA and TDMA systems, traffic channels are allocated to users as long as there are available channels among the fixed number of channels. On the other hand, in the communication systems based on CDMA-technology and its derivatives, the capacity of currently-known wireless systems—the number of mobile station users that can be supported—is limited by the number of available Walsh codes set by wireless standards. Although it is possible to increase the capacity of CDMA signal carriers, the number of available Walsh codes is still fixed. Moreover, since the Quality of Service (QoS) degrades as the number of mobile station users increases, the number of traffic channels set by the available Walsh codes cannot be fully taken advantage of to guarantee some level of QoS of voice calls to the mobile station users.

Furthermore, the capacity of the CDMA system is also limited by multi-user interference occurring between the transceivers using the same carrier frequency, and by fading of the communication channels due to multi-path propagation of a radio signal. Since the CDMA systems employ the cellular network in which a number of radio cells, each of which is made of several sectors, are used to provide radio coverage over a wide area than the area of one cell, the system is subject to interferences not only from MS's within a sector but also from MS's within neighboring cells or sectors. As the number of mobile station users in a sector or a cell increases, the overall level of interferences to the CDMA system increases. Thus, in practical situations, the capacity of the CDMA system set by the available Walsh codes is inapplicable. Instead, the capacity of the CDMA system depends largely on the interference conditions determined by network environment such as sector layout, inter-site distance and physical landscape. It is desirable to know the capacity of the CDMA system in a cell or a sector to manage wireless communication resources while ensuring QoS of the wireless communications provided to the users of the mobile stations.

The communication environment, which affects the call capacity of the CDMA system, such as number of mobile stations in a sector and geographical environment, varies depending upon the sector and time. Thus, the call capacity also changes according to time and the sector. It is desirable to measure the call capacity in a real time.

Thus, a need exists for measuring the capacity of the CDMA system in an individual cell automatically and dynamically, since the interference levels vary dynamically in response to change of the network environment.

SUMMARY

The teachings herein address one or more of the above noted needs relating to measuring a call capacity of a cellular network automatically.

The teachings below encompass a method for measuring a call capacity of a cellular network. The network includes a plurality of sectors including a test sector and neighboring sectors defined by a number of base stations. A plurality of test units are located both in the test sector and the neighboring sectors.

Throughput of activated best effort generators is measured while activating a first number of multimedia application generators within the test sector. Throughput of activated best effort generators is measured while activating a second number of multimedia application generators within the test sector. An approximate relationship between the throughput of the best effort generators and the number of the activated multimedia application generators is obtained based on the measurements. The call capacity within the test sector is determined from the approximate relationship between the throughput of best effort generators and the number of the activated multimedia application generators.

Interference level from activated test units located within the neighboring sectors is measured to determine total radio resources of the test sector. The call capacity within the test sector can be adjusted for a real commercial communication environment based on real interference levels from the neighboring sectors.

The call capacity within the test sector is the number of the activated multimedia application generators when the throughput of best effort generators in the approximate relationship is zero.

The approximate relationship between the number of the activated multimedia application generators and the throughput of best effort generators is obtained by extrapolating unknown values of the number of the activated multimedia application generators and the throughput of best effort generators from the measured two or more values of the number of the activated multimedia application generators and the throughput of best effort generators. Zero-crossing of the approximate relationship between the number of activated multimedia application generators and the throughput of best effort generators is obtained.

The call capacity is measured during a period when call traffic within the cellular network is low.

The activated best effort generators delivers data to the base station to make full use of the total radio resources within the test sector after a portion of the total resources are assigned for the multimedia application generators.

The activated best effort generators and the multimedia application generators may be installed in a same test unit having mobile communication capability in the test sector. Each of the activated best effort generators and each of the multimedia application generators are installed separately in test units having mobile communication capability installed in the test sector.

The approximate relationship is obtained by linear regression.

Another aspect of the disclosure encompasses a system for measuring a call capacity of a cellular network which includes a plurality of sectors having a test sector and neighboring sectors defined by a number of base stations.

The system comprises a plurality of multimedia application generators to deliver voice communication and a plurality of best effort generators to deliver data. At least one of the plurality of multimedia application generators and at least one of the plurality of best effort generators are located in the test sector.

The system further includes a test server coupled to one of the base stations for receiving voice communication and data from the plurality of multimedia application generators and the plurality of best effort generators and calculating the call capacity within the test sector by measuring throughput of best effort generators for a predetermined number of activated multimedia application generators and obtaining a approximate relationship between the number of activated multimedia application generators and the throughput of best effort generators from the measurement.

The test server measures a throughput of best effort generators for a first number of activated multimedia application generators and measures a throughput of best effort generators for a second number of activated multimedia application generators.

The test server obtains the approximate relationship by extrapolating unknown values of the number of the activated multimedia application generators and the throughput of best effort generators from the measured values of the number of the activated multimedia application generators and the throughput of best effort generators.

Each of the plurality of multimedia application generators is installed in a test unit having mobile communication capability and each of the plurality of best effort generators is installed in a test unit having mobile communication capability.

The plurality of best effort generators delivers data to make full use of remaining radio resources after a portion of the radio resources are assigned for the plurality of multimedia application generators.

The plurality of multimedia application generators and the plurality of best effort generators may be mobile communication enabled equipments installed in the test sector and the neighboring sectors dedicated for the calculation of call capacity. Alternatively, the plurality of multimedia application generators and the plurality of best effort generators may be real mobile stations deployed in the test sector and the neighboring sectors for wireless communication.

The first predetermined number of multimedia application generators among the plurality of the multimedia application generators and a second predetermined number of best effort generators among the plurality of best effort generators are installed in a test unit having mobile communication capability.

The test unit includes an antenna, a transceiver configured to establish wireless communication link with the base station, at least one multimedia application generator for generating multimedia application traffic, at least one best effort generator for generating data for best effort delivery to which the multimedia application traffic has priority over the wireless communication link with the base station to make full use of the total radio resources, a control unit for coordinating activation of the at least one multimedia application generator and the at least one best effort generator, and a processing unit for collecting and managing the multimedia application traffic and data for best effort delivery for the calculation of the call capacity by the test server.

The system further comprises a Radio Access Network (RAN), and a Packet Data Serving Node (PDSN) for providing access to data packet network. The test server is coupled to the RAN via the PDSN. The system further comprises an IP Multimedia Subsystem (IMS) for providing multimedia data service to mobile stations.

The multimedia application generators may be voice communication generators to generate voice communication signals. The multimedia application traffic may include Multimedia Message Service (MMS) messages, Short Message Service (SMS) messages, voice call traffic and video data stream.

Another aspect of the disclosure encompasses a processor-readable medium tangibly embodying a set of processor-executable instructions. Execution of the instructions activates a plurality of multimedia application generators and a plurality of best effort generators. At least one of the plurality of multimedia application generators and at least one of the plurality of best effort generators are located in a test sector of a cellular network.

The execution of the instruction measures throughput of best effort generators and calculates an approximate relationship between the throughput of best effort generators and the number of the activated multimedia application generators based on the measurement. A call capacity within the test sector is determined from the approximate relationship between the throughput of best effort generators and the number of the activated multimedia application generators.

Another aspect of the disclosure encompasses a method of measuring capacity in a cellular network having a plurality of sectors including a test sector and neighboring sectors defined by a number of base stations. A first amount of multimedia application traffic is generated through the test sector, from one or more test units located within the test sector and, then, best efforts traffic is generated from one or more test units located within the test sector to substantially fully load the determined total radio resources of the test sector. Throughput of the best effort traffic through the test sector is measured while generating the first amount of multimedia application traffic.

A second amount of multimedia application traffic is generated through the test sector, from one or more test units located within the test sector, and the second amount of multimedia application traffic is different from the first amount of multimedia application traffic. While generating the second amount of multimedia application traffic through the test sector, best efforts traffic from one or more test units located within the test sector is generated to substantially fully load the determined total radio resources of the test sector. Throughput of the best effort traffic through the test sector is measured while generating the second amount of multimedia application traffic.

An approximate relationship between the throughput of best effort traffic through the test sector and multimedia application traffic through the test sector is determined from the two measured throughputs of best effort traffic and the first and second amounts of multimedia application traffic. Call capacity within the test sector is determined from the approximate relationship and the measured interference level.

The determined call capacity within the test sector is adjusted for a real commercial communication environment based on the measured interference level and real communication environment.

Another aspect of the disclosure encompasses a method for measuring a capacity of multimedia traffic in a cellular network. The network includes a plurality of sectors including a test sector and neighboring sectors defined by a number of base stations and a plurality of test units are located both in the test sector and the neighboring sectors.

Throughput of activated best effort generators is measured while activating a first number of multimedia signal generators within the test sector. Throughput of activated best effort generators is measured while activating a second number of multimedia signal generators within the test sector. An approximate relationship is obtained between the throughput of activated best effort generators and the number of the activated multimedia signal generators. The capacity of multimedia traffic within the test sector is determined from the approximate relationship between the throughput of activated best effort generators and the number of the activated multimedia signal generators.

Another aspect of the disclosure encompasses a system for measuring a capacity of multimedia traffic in a cellular network. The cellular network includes a plurality of sectors including a test sector and neighboring sectors defined by a number of base stations. The system comprises a plurality of multimedia signal generators to deliver multimedia signals and a plurality of best effort generators to deliver data. At least one of the plurality of multimedia signal generators and at least one of the best effort generators are located in the test sector. The system further comprises a test server coupled to at least one of the base stations for receiving multimedia signals and data delivered from the plurality of multimedia signal generators and the plurality of best effort generators. The test server calculates the capacity of multimedia traffic within the test sector for measuring throughput of best effort generators for a predetermined number of activated multimedia signal generators and obtains an approximate relationship between the number of multimedia signal generators and the throughput of best effort generators from the measurement.

BRIEF DESCRIPTION OF THE DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitory have been described at a relatively high-level, without detail, in order to avoid unnecessarily obscuring aspects of the present teachings.

The various technologies disclosed herein relate to measuring a call capacity of a cellular network which includes a plurality of sectors including a test sector and neighboring sectors defined by a number of base stations. A plurality of voice communication generators and a plurality of best effort generators are located both in the test sector and the neighboring sectors. Interference level from activated test units located within the neighboring sectors and the test sector represents total radio resources of the test sector. Throughput of best effort generators in the test sector is measured while activating a predetermined number of voice communication generators.

An approximate relationship between the throughput of best effort generators and the number of the activated voice communication generators is obtained. Typically, this relationship is linear, where the throughput for best effort traffic is inversely proportional to the number of active voice communication. The call capacity within the test sector is determined from the approximate relationship between the throughput of best effort generators and the number of the activated voice communication generators, for example, from the number of voice communications at which best effort throughput falls to zero.

The call capacity within the test sector measured is adjusted for a real commercial communication environment based on real interference levels from the neighboring sectors.

In following examples, while a test unit having mobile communication capability is described as including both at least one voice communication generator and at least best effort generator, the test unit may be implemented with only voice communication generators or only best effort generators. The test unit with only voice communication generators or the test unit with only best effort generators may be implemented by disabling the best effort generators or voice communication generators in the test unit including both at least one voice communication generator and at least best effort generator.

Figure 1:
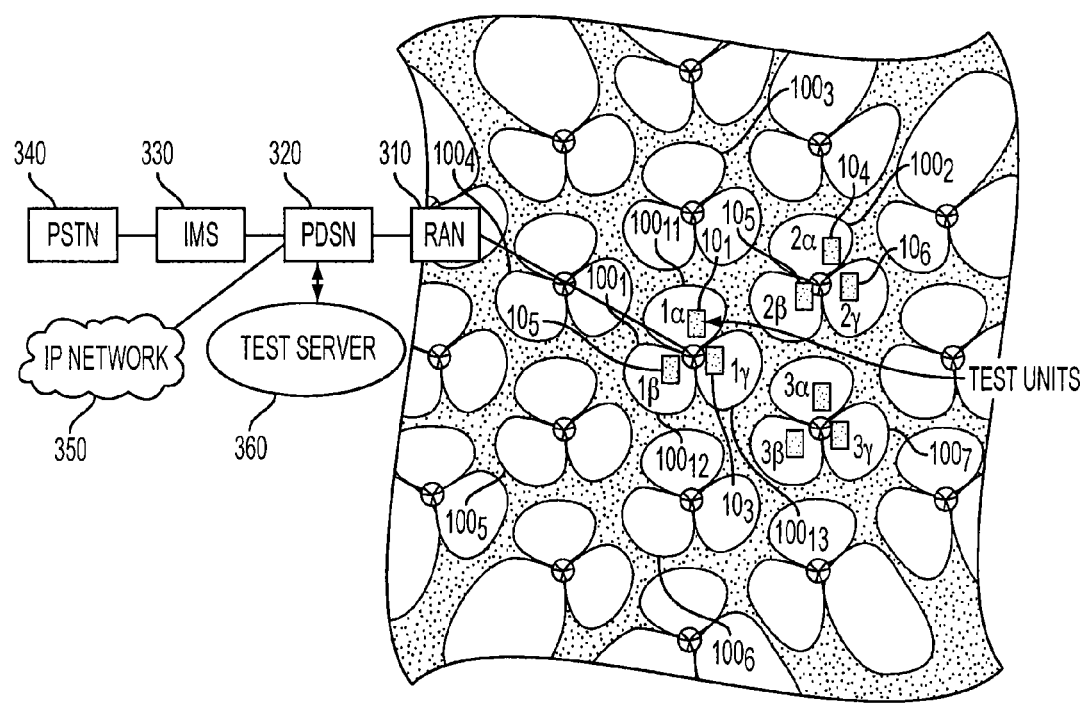
FIG. 1 illustrates a cellular network system which measures capacity of individual cells and/or sectors.

FIG. 1 illustrates one example of a cellular network system which measures capacity of individual cells or sectors.

In the cellular network, the geographical region to be serviced is divided into smaller areas called cells $100_1$~$100_n$. In each cell the coverage is provided by a base station (BS) $200_1$~$200_n$. In the example, each cell $100_x$ is divided into three sectors $100_{x1}$~$100_{x3}$. Within each coverage area, mobile stations are used as interfaces between the users and the network.

A number of test units $10_1$~$10_n$ are distributed in a test cell $100_1$ or a test sector $100_{11}$ and in neighboring cells $100_2$~$100_7$ or neighboring sectors $100_{12}$~$100_{13}$ for sending signals for use in measuring call capacity in the test cell or the test sector.

The test units $10_1 \sim 10_n$ are devices having mobile communication capability that are dedicated to measuring the capacity of the system. The test units generate and send signals which simulate voice calls as well as other data transmitted from and received at the mobile stations, for example to simulate the best effort traffic. The test units $10_1 \sim 10_n$ may be purpose built device or may be real mobile stations implemented with functionalities of the test units discussed below. The test signals are sent to and collected by the base station $200_1$ for measuring call capacity of test cell or sector. Detailed structures and functions of an example of the test units $10_1 \sim 10_n$ are described later.

A base station $100_1$ serves as a focal point to distribute information to, and collect information from, the mobile stations operating within its cellular coverage area. A base station $100_1$ is also connected to the backbone of the network 300, usually by a dedicated link. In a packet network implementation such as shown by way of example in FIG. 1, the base station $100_1$ is coupled to one or more Packet Data Serving Nodes (PDSNs) 320, which send and receive packet data to and from the network, via a Radio Access Network (RAN) 310 of which the base station is a part. The PDSN 320 provides access to one or more data packet networks, in this example Internet Protocol network 350. Data or calls received via the PDSN 320 are forwarded to the IP network 350, and packet data originated from the IP network 350 are sent to the mobile stations via the PDSN 320 and RAN 310.

The PDSN 320 is also coupled to IP Multimedia Subsystem (IMS) 330 for enabling mobile station users to engage in voice communications, establish data communications over a broadband communication link, and utilize a broadband communication link while simultaneously engaging in a voice call.

A Public Switching Telephone Network (PSTN) 350 is coupled to the IMS 330 to allow the external public circuit switched network to connect with the cellular network A test server 360 is connected to the RAN 310 via the PDSN 320 for collecting test signals sent from a set of the test units located in the test cell or sector and neighboring cells or sector. The test server 360 calculates capacity of the test cell or the test sector based on the collected test signals. The manner of calculation of the call capacity by the test server 360 will be explained later in this specification.

The test server 360, for example, includes a data communication interface for packet data communication with the base station from which voice traffic and best effort traffic from the test units are sent to the test server 360. The server 360 also includes a central processing unit (CPU), in the form of one or more dedicated or general purpose processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined below may be embodied in programming, e.g. in the form of software, firmware, or microcode executable by a server or other programmable device and/or by mobile stations or other devices configured to operate as the test units. Such programming typically is carried on or otherwise embodied in a medium or media. Terms such as "machine-readable" medium and "computer-readable" medium as used herein generically refer to any tangible medium that participates in providing instructions and/or data to a programmable processor, such as the CPU or other processor of a server computer or test unit device, for execution or other processing. A medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

Figure 2:
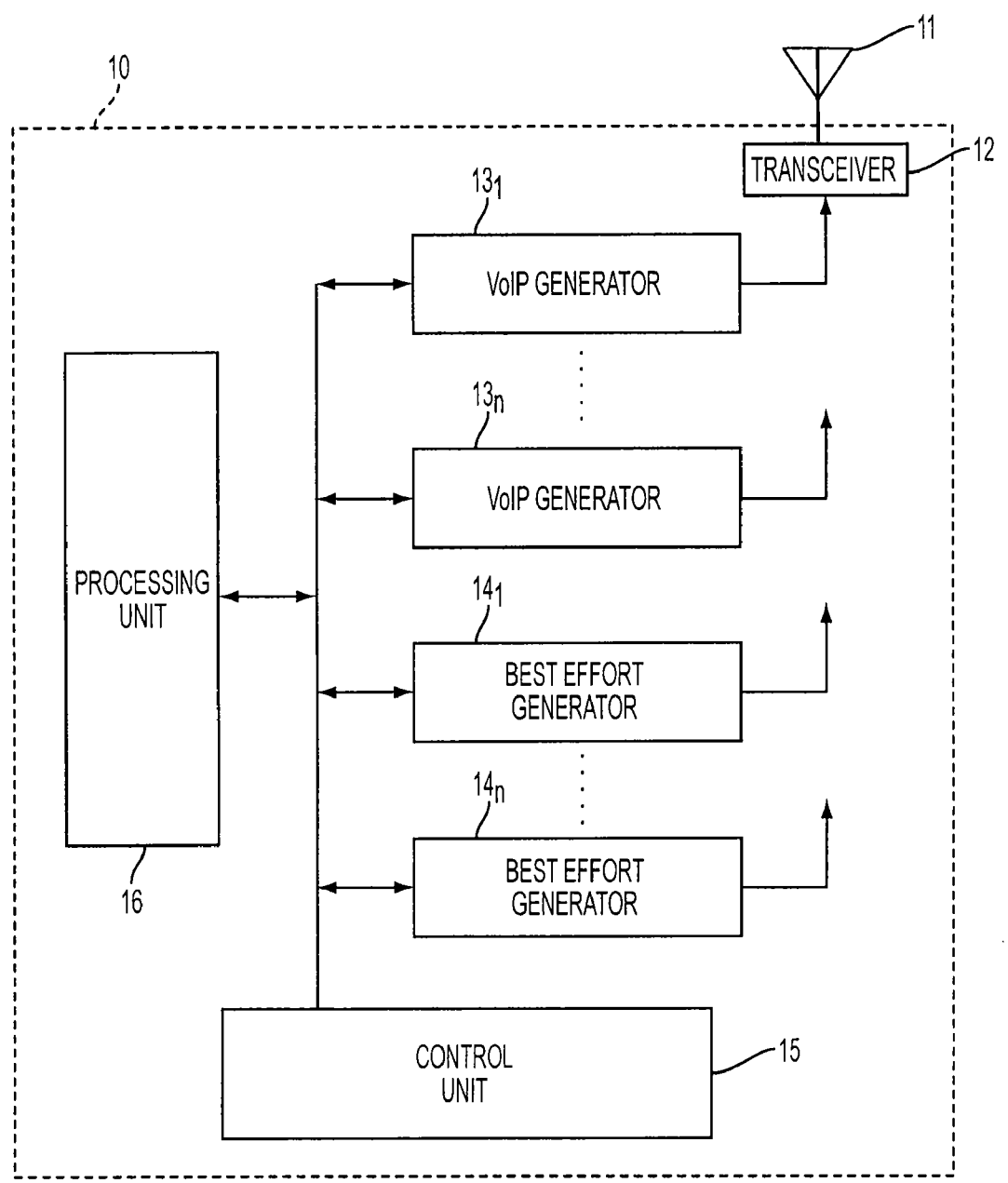
FIG. 2 illustrates a schematic diagram of a test unit for use in the network of FIG. 1.

FIG. 2 illustrates a schematic diagram of the test unit 10. The test unit 10 is a device which models one or more real mobile stations, but is dedicated to operations enabling measuring of the capacity of the system in the test sector. The test unit 10 may be a real mobile handset implemented with the following functionalities for use in measuring the capacity of the system. The test unit 10 includes an antenna 11 and a digital transceiver 12, in this case, compatible with digital wireless packet communications with the base station for wireless communication. The transceiver 12 provides two-way wireless communication of information, such as vocoded speech samples and digital message information. If compatible with the base station, the communications via the transceiver 12 could include both cellular digital voice from voice communication and packet data communications from best effort generators. Via the base station, the communications via the transceiver 12 all utilize IP packet transport.

The test unit 10 includes Voice Over IP (VoIP) generator $13_1 \sim 13_n$ for generating and sending VoIP signals which simulate real IP packet based voice communications on a channel between the test unit 10 and the base station. When a capacity of multimedia traffic in a cell or sector is determined, one or more multimedia signal generators, e.g. for delivering video streams can be installed in the test unit 10 to simulate mobile stations delivering multimedia signals instead of or together with the VoIP generator $13_1 \sim 13_n$. The test unit 10 further includes Best Effort (BE) generators $14_1 \sim 14_n$ for generating BE traffic signals which have lower priority than the voice signals of VoIP generators or the multimedia signals of the multimedia signal generators. While the following examples are described based on VoIP generators as an example of the multimedia application generators, other multimedia application generators can be used instead of or together with the VoIP generators.

For fixed radio resources, the resources are allocated to the voice signals prior to the BE traffic signals, because the voice signal needs to be communicated in real time, whereas the BE traffic signals for use in data delivery do not have to be delivered in real time. The residual radio resources are then allocated to the BE traffic signals. The BE traffic signals may be File Transfer Protocol (FTP) files or other type signals so long as the BE traffic signals have lower priority than the VoIP services or multimedia services and the required data rate is big enough to use up the residual radio resources so that the system is operating at its full capacity. The allocation of the radio resources are managed by the test server 360. While the following example describes only measuring call capacity and VoIP generators included in the test unit 10, the multimedia signal generators may be added in the test unit 10 when measuring the capacity of the multimedia traffic and the process to measure the capacity of the multimedia traffic is same as measuring the call capacity, except that the multimedia signal generators supplant or perform the same function of the VoIP generators.

The test unit 10 further includes a control unit 15 and a processing unit 16. The control unit 15 coordinates activation of the VoIP generators $13_1 \sim 13_n$ and the BE generators $14_1 \sim 14_n$. The processing unit 16 processes the data generated by the VoIP generators and the BE generators. The operation of the control unit 15 and the processing unit 16 may be controlled by instructions from the test server 360 or by pre-installed module in the test unit 10. The control unit 15 and the processing unit 16 may be implemented with software modules having the above functionalities on a microprocessor. Alternatively, separate microprocessors may embody the control unit 15 and the processing unit 16.

While the test unit 10 having mobile communication capability is described as including both the VoIP generators $13_1 \sim 13_n$ and the best effort generators $14_1 \sim 14_n$, the test unit 10 may be implemented with only VoIP generators $13_1 \sim 13_n$ or only best effort generators $13_1 \sim 13_n$. The test unit 10 with only VoIP generators $13_1 \sim 13_n$ or the test unit with only best effort generators $14_1 \sim 14_n$ may be implemented by disabling the best effort generators $14_1 \sim 14_n$ or voice communication generators $13_1 \sim 13_n$ in the test unit 10 including both at least one voice communication generator and at least best effort generator.

Figure 3:
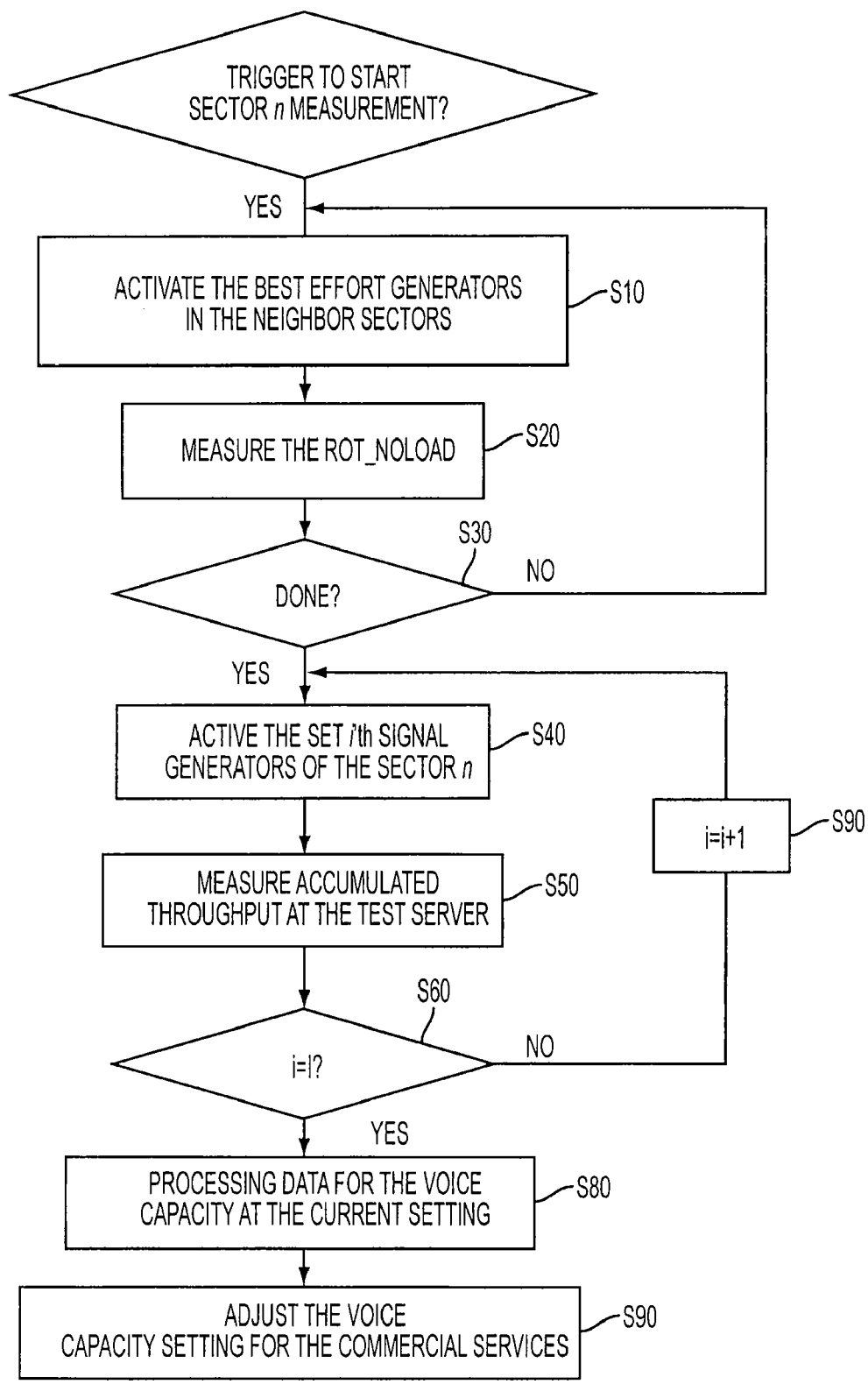
FIG. 3 is a flow diagram of a method of calculating the capacity of the cellular network in a test sector.

One example of a process to measure the capacity of the cellular network is explained in the following. FIG. 3 is a flow diagram of a method of calculating the capacity of the cellular network in a test sector. To calculate the capacity of the cellular network in a controlled environment, the process is conducted at a time window when call traffic in the test sector is scant, e.g. around midnight or in the period from 1-4 AM. The radio resources in the test sector would be fully taken advantage of during the process to simulate a situation in which maximum number of available mobile stations has radio connectivity with the base station in the test sector. The following process to measure the capacity is performed by the test server 360 and the activation of test unit 10 is controlled by instructions sent from the test server 360.

While the following example describes measuring a call capacity in a test sector, the subject matter encompasses measuring a capacity of multimedia traffic in the test sector. When measuring the capacity of multimedia traffic, as described above, the multimedia signal generators are installed in the test units 10. The multimedia signals generated by the multimedia signal generators have priority to the Best Effort traffic generated by the BE generators $14_1 \sim 14_n$. All other processes in the measuring the capacity of multimedia traffic are same as what are described in the following example of measuring the call capacity.

As an initial step of measuring the capacity of the cellular network in the test sector, the total radio resource is assumed. The total resource in a test sector is determined by the amount of interference level that the system can tolerate and the interference level may be measured by rise-over-thermal (RoT). The RoT is defined as the ratio of the total power received in the reverse link to thermal noise power received at a receiver antenna that is located at the base station or at a certain point in the test sector. The assumed total radio resource is defined as a target operational RoT ($RoT_{Op}$). In a real situation, the total radio resources are assigned for voice delivery and other applications including data delivery. The voice delivery has a higher priority for access to the radio resources than the data delivery, since the voice delivery requires real time communication, but the data delivery can be performed in a non-real time communication. Thus, the target operational RoT ($RoT_{Op}$) can be achieved by activating a number of BE generators enough to take full use of remaining radio resources after a portion of the radio resources are set aside for a certain number of the VoIP generators.

The assumed target operational RoT ($RoT_{Op}$), i.e. interference level suffered by the test sector includes interferences from surrounding sectors ($RoT_{noload}$) and interferences from traffic within the test sector ($RoT_{samecell}$) as the following equation (1).

$$RoT_{Op} = RoT_{noload} + RoT_{samecell} \quad (1)$$

where $RoT_{noload}$ is the interference from the surrounding cell sites.

The interferences from all the traffic within the test sector $RoT_{samecell}$ can be expressed as follows.

$$RoT_{samecell} = RoT_{VoIP} + RoT_{BE} + RoT_{Overhead} \quad (2)$$

where $RoT_{VoIP}$, $RoT_{BE}$ and $RoT_{Overhead}$ are the RoT's for the VoIP generators, the BE generators and the overhead interference, respectively. The $RoT_{VoIP}$ $RoT_{BE}$ and $ROT_{Overhead}$ can be measured by activating only VoIP generators, only BE generators within the test sector and deactivating all test units respectively. The RoT for the VoIP generators $RoT_{VoIP}$ depends on the application-level QoS setting, the number of voice users ($n_{VoIP}$) and the voice activity factor (VAF). Hence, it can be expressed as, $$RoT_{VoIP} = f(QoS, n_{VoIP}, VAF). \quad (3)$$

As a first step of the calculation process, the RoT from the surrounding sectors $RoT_{noload}$ is measured by activating test units within the surrounding sectors (S10) and deactivating all test units within the test sector. (S20) The activation and deactivation of test units are controlled by instructions sent from the test server 360. Until the RoT from the surrounding sectors $RoT_{noload}$ is measured, the measuring steps (S10 and S20) are reiterated. (S30) The measured RoT from the surrounding sectors $RoT_{noload}$ is sent to the test server 360 and is used in adjusting later-calculated call capacity in a real commercial environment Under the assumed target operational RoT ($RoT_{Op}$), i.e. the total radio resource, a relationship between a number of activated VoIP generators within the test sector $n_{VoIP}$, and the BE throughput $\tau_{BE}$ corresponding to the number of activated VoIP generators in an environment where the radio resources are fully utilized is obtained. As previously described, the total radio resources are assumed to fully assigned to VoIP generators or the BE generators. Thus, the BE throughput $\tau_{BE}$ changes as the number of the activated VoIP generators $n_{VoIP}$, changes under the assumed target operational RoT ($RoT_{Op}$).

To obtain $RoT_{Op}$, a certain number of VoIP generators, which may be included in one or more test units, for example 4 VoIP generators, in the test sector are activated. (S40) For the assumed target operational RoT ($RoT_{Op}$), all the other BE generators in the test sector are activated to ensure all the total radio resource to be utilized. Then, the test server 360 measures accumulated throughput of the BE generators based on received data via the base station. (S50) Thereafter, for a different number of VoIP generators, for example 8 VoIP generators (S70), the accumulated throughput of the BE generators is measured. After the above steps (S40 and S50) are performed for two or more different number of activated VoIP generators, the relationship between the number of VoIP generators and the throughput of the BE generators are obtained based on the result of the steps S40 and S50 for two or more different numbers of VoIP generators.

A linear relationship between the two values, the number of the activated VoIP generators $n_{VoIP}$ and the BE throughput $\tau_{BE}$, may be obtained by a linear approximation. For example, a linear least square fitting expressed by the following Equation may be used.

$$g(a,b)|_{RoT_{Op}} = \tau_{BE} = a + bn_{VoIP} \qquad (4)$$

where $$a = \frac{\sum_{i=1}^{I} \tau_{BE}^{(i)} \sum_{i=1}^{I} (n_{VoIP}^{(i)})^2 - \sum_{i=1}^{I} n_{VoIP}^{(i)} \sum_{i=1}^{I} n_{VoIP}^{(i)} \tau_{BE}^{(i)}}{I \sum_{i=1}^{I} (n_{VoIP}^{(i)})^2 - \left(\sum_{i=1}^{I} n_{VoIP}^{(i)}\right)^2}$$

$$b = \frac{I \sum_{i=1}^{I} \tau_{BE}^{(i)} n_{VoIP}^{(i)} - \sum_{i=1}^{I} n_{VoIP}^{(i)} \sum_{i=1}^{I} \tau_{BE}^{(i)}}{I \sum_{i=1}^{I} (n_{VoIP}^{(i)})^2 - \left(\sum_{i=1}^{I} n_{VoIP}^{(i)}\right)^2}$$

Figure 4:
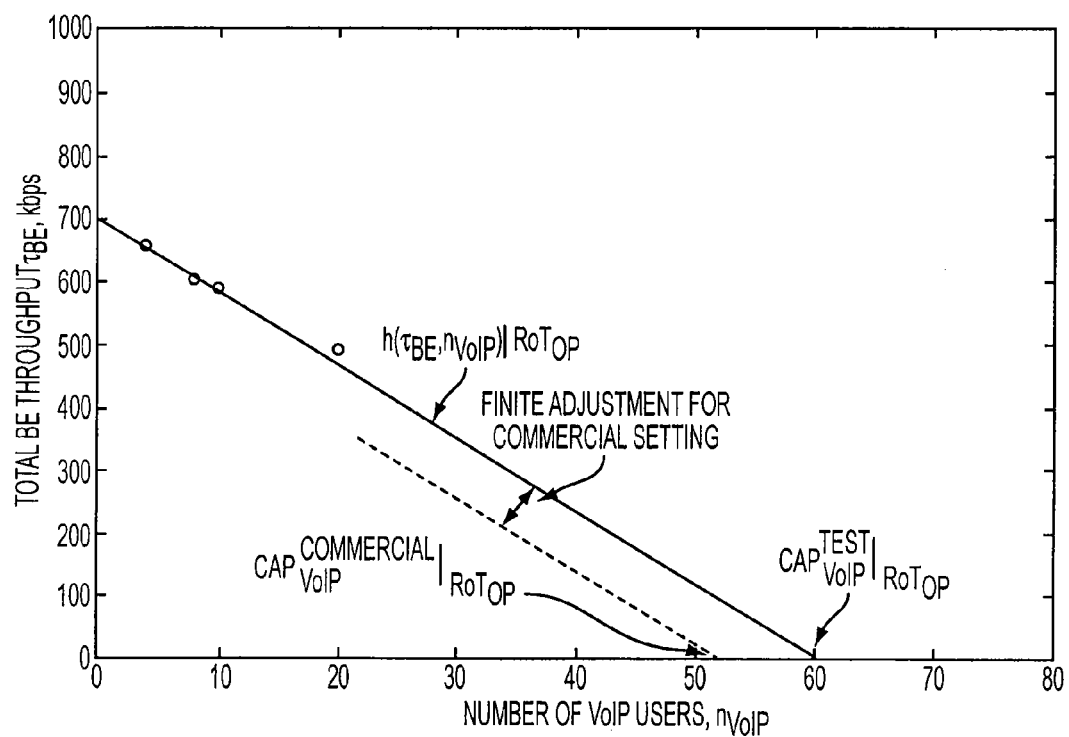
FIG. 4 is a graph illustrating an example of a call capacity measurement according to the method of FIG. 3.

The liner relationship and the least linear square fitting from the measured BE throughputs for two or more different number of activated VoIP generators are illustrated in FIG. 4.

The server or an element processing the measurement data from the server can then determine voice capacity. The voice call capacity within the test sector can be obtained from the linear relationship expressed in the Equation (4). (S80) For the target operational RoT ($RoT_{Op}$), the voice call capacity within the test sector is the value of $n_{VoIP}$ from the equation (4) when the throughput of the BE generators would be 0 (extrapolated zero-crossing of the solid line in FIG. 4), since it represents maximum number of activated VoIP generators when the assumed radio total resource is not assigned to any activated BE generators. For the target operational RoT ($RoT_{Op}$), the voice capacity within the test sector $Cap_{VoIP}^{Test}$ can be expressed by the following Equation (5).

$$Cap_{VoIP}^{Test}(RoT_{Op}) = h(\tau_{BE}, n_{VoIP})|_{\tau_{BE}=0} \qquad (5)$$

However, the estimate of voice capacity within the test sector $Cap_{VoIP}^{Test}$ needs to be adjusted to reflect a real commercial communication environment where real mobile stations rather than the test units are within the sector, since the voice capacity within the test sector $Cap_{VoIP}^{Test}$ is obtained in a controlled test environment in which test units dedicated to the measurement of call capacity are installed in the test sector and the assumed target operational RoT ($RoT_{Op}$), differs from RoT in the real commercial environment $RoT_{Commercial}$. The real cellular network capacity $Cap_{VoIP}^{Commercial}$ for the test sector is adjusted to the commercial setting, as the following Equation (6). (S90)

$$Cap_{VoIP}^{Commerical} = \frac{1 + f_{test}}{1 + f_{Op}} Cap_{VoIP}^{Test} \qquad (6)$$

where $$f_{test} = \frac{RoT_{noload,test} - 1}{RoT_{Op} - RoT_{noload,test}}$$

and $$f_{Op} = \frac{RoT_{noload,Op} - 1}{RoT_{Op} - RoT_{noload,Op}}$$

with $RoT_{noload,test}$ and $RoT_{noload,Op}$ being the other-cell RoT interferences during the test and commercial operation respectively. For instance, a finite adjustment can be set for handover procedures or as a safety margin as shown in FIG. 4.

The measured call capacity may be used for radio resource management, base station dimensioning, capacity planning and other optimization procedures. Since the real-time multimedia call capacity is automatically measured based on the specific deployment scenario, the accuracy of the call capacity is immensely enhanced and the accurate measurement can improve the network utilization while simultaneously reducing blocking probability and avoiding network instability.

In addition to reducing blocking probability due to the improved spectrum efficiency, the network is better able to provide guaranteed QoS and improve the user satisfaction since the QoS is taken into account in the measurement and calculation.

The network can trade off the admission for different applications by admitting higher revenue applications being able to find the capacities for different applications.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

| | |
|---|---|
| QoS: | Quality of Service |
| RoT: | Rise over Thermal |
| IMS: | IP Multimedia Subsystem |
| PDSN: | Packet Data Serving Node |

-continued

| | |
|---|---|
| RAN: | Radio Access Network |
| PSTN: | Public Switching Telephone Network |
| IP: | Internet Protocol |
| FTP: | File Transfer Protocol |
| FDMA: | Frequency Division Multiple Access |
| TDMA: | Time Division Multiple Access |
| CDMA: | Code Division Multiple Access |

What is claimed is:

1. A method for measuring a call capacity of a cellular network, the network including a plurality of sectors including a test sector and neighboring sectors defined by a number of base stations, a plurality of test units being located both in the test sector and the neighboring sectors, the method comprising steps of:
  (a) measuring throughput of activated best effort generators while activating a first number of multimedia application generators within the test sector;
  (b) measuring throughput of activated best effort generators while activating a second number of multimedia application generators within the test sector;
  (c) obtaining an approximate relationship between the throughput of activated best effort generators and the number of the activated multimedia application generators based on measurement in steps (a) and (b); and
  (d) determining the call capacity within the test sector from the approximate relationship between the throughput of activated best effort generators and the number of the activated multimedia application generators.

2. The method of claim 1, further comprising step of:
  (e) measuring interference level from activated test units located within the neighboring sectors to determine total radio resources of the test sector; and
  (f) adjusting the determined call capacity within the test sector for a real commercial communication environment based on the measured interference level in the step (e).

3. The method of claim 2, wherein the step(e) is performed based on the following equation:

$$Cap_{VoIP}^{Commerical} = \frac{1+f_{test}}{1+f_{Op}} Cap_{VoIP}^{Test}$$

$$f_{test} = \frac{RoT_{noload,test} - 1}{RoT_{Op} - RoT_{noload,test}}$$

$$f_{Op} = \frac{RoT_{noload,Op} - 1}{RoT_{Op} - RoT_{noload,Op}},$$

wherein $RoT_{noload,test}$ RoT and $RoT_{noload,Op}$ are the interference levels from the neighboring sectors during the test and a commercial operation respectively, wherein $Cap_{VoIP}^{Test}$, and $Cap_{VoIP}^{Commericial}$ are the determined call capacity in the test and the adjusted call capacity in the real commercial communication environment respectively, and wherein $f_{test}$ and $f_{Op}$ are an operating frequency of test units during the measurement and an operating frequency of the real commercial communication.

4. The method of claim 2, wherein the steps (a)-(e) are performed during a period when call traffic within the cellular network is low.

5. The method of claim 1, wherein, in the step (d), the determined call capacity within the test sector is the number of the activated multimedia application generators when the throughput of activated best effort generators is zero in the approximate relationship.

6. The method of claim 5, wherein the step (d) comprises:
  obtaining the approximate relationship between the number of the activated multimedia application generators and the throughput of activated best effort generators by extrapolating unknown values of the number of the multimedia application generators and the throughput of activated best effort generators from the measured two or more values of the number of the activated multimedia application generators and the throughput of activated best effort generators; and
  finding zero-crossing of the approximate relationship between the number of the multimedia application generators and the throughput of activated best effort generators.

7. The method of claim 1, wherein, in the steps (a) and (b), the activated best effort generators delivers data to the base station to make full use of the total radio resources within the test sector after a portion of the total resources are assigned for the first number of multimedia application generators and the second number of multimedia application generators.

8. The method of claim 1, wherein, in the step (b), the approximate relationship is obtained by a least square linear fitting.

9. The method of claim 8, wherein the multimedia application generators are voice communication generators to generate voice communication signals.

10. The method of claim 9, wherein the linear square fitting is performed by the following equation:

$$\tau_{BE} = a + b^* n_{VoIP},$$

wherein $$a = \frac{\sum_{i=1}^{I} \tau_{BE}^{(i)} \sum_{i=1}^{I} (n_{VoIP}^{(i)})^2 - \sum_{i=1}^{I} n_{VoIP}^{(i)} \sum_{i=1}^{I} n_{VoIP}^{(i)} \tau_{BE}^{(i)}}{I \sum_{i=1}^{I} (n_{VoIP}^{(i)})^2 - \left(\sum_{i=1}^{I} n_{VoIP}^{(i)}\right)^2}$$

and $$b = \frac{I \sum_{i=1}^{I} \tau_{BE}^{(i)} n_{VoIP}^{(i)} - \sum_{i=1}^{I} n_{VoIP}^{(i)} \sum_{i=1}^{I} \tau_{BE}^{(i)}}{I \sum_{i=1}^{I} (n_{VoIP}^{(i)})^2 - \left(\sum_{i=1}^{I} n_{VoIP}^{(i)}\right)^2},$$

wherein $n_{VoIP}$ is the number of the activated VoIP generators within the test sector and $\tau_{BE}$ is the throughput dedicated for best effort delivery.

11. The method of claim 1, wherein the activated best effort generators and the multimedia application generators are installed in a same test unit having mobile communication capability, installed in the test sector.

12. The method of claim 1, wherein each of the activated best effort generators and each of the multimedia application generators are installed separately in test units having mobile communication capability, installed in the test sector.

13. A system for measuring a call capacity of a cellular network, the cellular network including a plurality of sectors including a test sector and neighboring sectors defined by a number of base stations, the system comprising:
- a plurality of multimedia application generators to deliver multimedia application traffic and a plurality of best effort generators to deliver data, at least one of the plurality of multimedia application generators and at least one of the best effort generators being located in the test sector;
- a test server coupled to at least one of the base stations for receiving multimedia application traffic delivered from the plurality of multimedia application generators and the plurality of best effort generators and calculating the call capacity within the test sector for measuring throughput of best effort generators for a predetermined number of activated multimedia application generators and obtaining an approximate relationship between the number of multimedia application generators and the throughput of best effort generators from the measurement.

14. The system of claim 13, wherein the test server measures a throughput of best effort generators for a first number of activated multimedia application generators and measures the throughput of best effort generators for a second number of activated multimedia application generators.

15. The system of claim 14, wherein the test server obtains the approximate relationship by extrapolating unknown values of the number of the activated multimedia application generators and the throughput of best effort generators from the measured values of the number of the activated multimedia application generators and the throughput of best effort generators.

16. The system of 13, wherein each of the plurality of multimedia application generators is installed in a test unit having mobile communication capability and each of the plurality of best effort generators is installed in a test unit having mobile communication capability.

17. The system of claim 13, wherein the approximate relationship is obtained by a least square linear fitting.

18. The system of claim 13, wherein the plurality of best effort generators delivers data to take full use of remaining radio resources after a portion of the radio resources are assigned for the plurality of multimedia application generators.

19. The system of claim 13, wherein the test server measures interference level from activated test units located within the neighboring sectors to determine total radio resources of the test sector.

20. The system of claim 13, wherein the plurality of multimedia application generators and the plurality of best effort generators are mobile communication enabled equipments provided for the calculation of call capacity in the test sector and the neighboring sectors.

21. The system of claim 13, wherein the plurality of multimedia application generators and the plurality of best effort generators are real mobile stations deployed in the test sector and the neighboring sectors for wireless communication.

22. The system of claim 13, wherein a first predetermined number of multimedia application generators among the plurality of the multimedia application generators and a second predetermined number of best effort generators among the plurality of best effort generators are installed in a test unit having mobile communication capability.

23. The system of claim 13, further comprising a test unit including:
- an antenna;
- a transceiver configured to establish wireless communication link with the base station;
- at least one of the multimedia application generators for generating multimedia application traffic;
- at least one of best effort generators for generating data for best effort delivery to which the multimedia application traffic has priority over the wireless communication link with the base station to make full use of the total radio resources;
- a control unit for coordinating activation of the multimedia application generators and the best effort generators; and
- a processing unit for collecting and managing the multimedia application traffic and data for best effort delivery for the calculation of the call capacity by the test server.

24. The system of claim 13, further comprising:
- a Radio Access Network (RAN);
- a Packet Data Serving Node (PDSN) for providing access to data packet network, the test server being coupled to the RAN via the PDSN; and
- an IP Multimedia Subsystem (IMS) for providing multimedia data service to mobile stations.

25. The system of claim 13, wherein the multimedia application generators are voice communication generators to generate voice communication signals.

26. A non-transitory machine-readable medium tangibly embodying a set of processor-executable instructions, wherein execution of the instructions causes a processor to perform operations comprising:
- (a) activating a plurality of multimedia application generators and a plurality of best effort generators, at least one of the plurality of multimedia application generators and at least one of the plurality of best effort generator being located in a test sector in a cellular network;
- (b) measuring throughput of the plurality of best effort generators while activating a predetermined number of multimedia application generators;
- (c) calculating an approximate relationship between the throughput of the plurality of best effort generators and the number of multimedia application generators based on measurement; and
- (d) determining a all capacity within the test sector from the approximate relationship between the throughput of the plurality of best effort generators and the number of the activated multimedia application generators.

27. The medium of claim 26, wherein the steps (b) and (c) are performed for two or more different number of activated multimedia application generators.

28. The medium of claim 26, wherein the step (c) comprises:
- obtaining the approximate relationship between the number of the activated multimedia application generators and the throughput of best effort generators by extrapolating unknown values of the number of the activated multimedia application generators and the throughput of the plurality of best effort generators from the measured two or more values of the number of the activated multimedia application generators and the throughput of the plurality of best effort generators; and
- finding zero-crossing of the approximate relationship between the number of the activated multimedia application generators and the throughput of the plurality of best effort delivery.

29. A method of measuring capacity in a cellular network having a plurality of sectors including a test sector and neighboring sectors defined by a number of base stations, the method comprising steps of:
- (a) measuring interference level from a plurality of activated test units located within the neighboring sectors to determine total radio resources of the test sector; and
- (b) generating a first amount of multimedia application traffic through the test sector, from one or more test units located within the test sector;
- (c) while generating the first amount of multimedia application traffic through the test sector, generating best efforts traffic from one or more test units located within the test sector to substantially fully load the determined total radio resources of the test sector;
- (d) measuring throughput of the best effort traffic through the test sector while generating the first amount of multimedia application traffic;
- (e) generating a second amount of multimedia application traffic through the test sector, from one or more test units located within the test sector, the second amount of multimedia application traffic being different from the first amount of multimedia application traffic;
- (f) while generating the second amount of multimedia application traffic through the test sector, generating best efforts traffic from one or more test units located within the test sector to substantially fully load the determined total radio resources of the test sector;
- (g) measuring throughput of the best effort traffic through the test sector while generating the second amount of multimedia application traffic;
- (h) determining an approximate relationship between the throughput of best effort traffic through the test sector and multimedia application traffic through the test sector, from the two measured throughputs of best effort traffic and the first and second amounts of multimedia application traffic; and
- (i) determining voice call capacity within the test sector from the approximate relationship and the measured interference level.

30. The method of claim 29, further comprising:
- (j) adjusting the determined call capacity within the test sector for a real commercial communication environment based on the measured interference level in the step (a).

31. The method of claim 29, wherein the multimedia application traffic includes voice call traffic, Multimedia Message Service(MMS) messages, Short Message Service (SMS) messages, and video data stream.

* * * * *